United States Patent
Matsuda et al.

(10) Patent No.: US 9,358,937 B2
(45) Date of Patent: Jun. 7, 2016

(54) WIRE HARNESS WITH SHEATHING MEMBER AND PATH REGULATORS

(71) Applicant: SUMITOMO WIRING SYSTEMS, LTD., Mie (JP)

(72) Inventors: Toru Matsuda, Mie (JP); Takaaki Fukui, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 10 days.

(21) Appl. No.: 14/381,081

(22) PCT Filed: Dec. 27, 2012

(86) PCT No.: PCT/JP2012/083874
§ 371 (c)(1),
(2) Date: Aug. 26, 2014

(87) PCT Pub. No.: WO2013/136633
PCT Pub. Date: Sep. 19, 2013

(65) Prior Publication Data
US 2015/0000975 A1   Jan. 1, 2015

(30) Foreign Application Priority Data
Mar. 14, 2012 (JP) .................. 2012-057187

(51) Int. Cl.
| B60R 16/02 | (2006.01) |
| H02G 3/30 | (2006.01) |
| H01B 3/48 | (2006.01) |
| B32B 1/00 | (2006.01) |
| F16L 3/22 | (2006.01) |
| H02G 3/32 | (2006.01) |
| H02G 3/04 | (2006.01) |

(52) U.S. Cl.
CPC .............. *B60R 16/0215* (2013.01); *H02G 3/30* (2013.01); *H02G 3/0481* (2013.01); *H02G 3/32* (2013.01)

(58) Field of Classification Search
CPC .................................................. B60R 16/0215
USPC ........................................... 174/72 A, 124 R
See application file for complete search history.

(56) References Cited

U.S. PATENT DOCUMENTS

| 5,703,330 A * | 12/1997 | Kujawski ............ B60R 16/0215 138/157 |
| 5,972,477 A * | 10/1999 | Kim .......................... B32B 3/28 264/257 |

(Continued)

FOREIGN PATENT DOCUMENTS

| JP | 2009-241889 | 10/2009 |
| JP | 2010-283965 | 12/2010 |
| JP | 2012-5165 | 1/2012 |

OTHER PUBLICATIONS

Search report from PCT/JP2012/083874, mail date is Feb. 5, 2013.

*Primary Examiner* — Timothy Thompson
*Assistant Examiner* — Michael F McAllister
(74) *Attorney, Agent, or Firm* — Greenblum & Bernstein, P.L.C.

(57) ABSTRACT

A wire harness includes a wire bundle and a sheathing member covering the wire bundle and configured from a nonwoven member that has been hot-pressed. The sheathing member includes a plurality of path regulators along each of an extension direction and a circumference direction of the wire bundle, the path regulators being capable of regulating a path of a long member to be arranged along a surface of the sheathing member.

4 Claims, 7 Drawing Sheets

(56) References Cited

U.S. PATENT DOCUMENTS 7,754,301 B2 * 7/2010 Yamaguchi ......... B60R 16/0215
 428/34.9

2013/0056240 A1 * 3/2013 Kawai .................. H02G 3/0481
 174/124 R
2013/0075155 A1 3/2013 Kawai et al.

* cited by examiner

WIRE HARNESS WITH SHEATHING MEMBER AND PATH REGULATORS

FIELD OF THE INVENTION

The present invention relates to a wire harness.

BACKGROUND OF THE INVENTION

Conventionally, various technologies have been proposed in relation to a wire harness. For example, a wire harness in which a wire bundle is covered by a sheathing member is described in Patent Literature 1. The sheathing member described in Patent Literature 1 is fabricated by hot-pressing a nonwoven member. In the wire harness described in Patent Literature 1, a long member fixation portion is provided to the sheathing member, the long member fixation portion holding a long member such as a washer fluid hose supplying washer fluid.

RELATED ART

Patent Literature

Patent Literature 1: Japanese Patent Laid-open Publication No. 2012-5165

SUMMARY OF THE INVENTION

Problems to Be Solved by the Invention

In a case where the long member is held by the long member fixation portion described in Patent Literature 1, the long member can only be arranged along an extension direction of the wire bundle. In other words, there is no freedom for a path of the long member. Accordingly, even in cases where there is a change to a layout of components within a vehicle to which the wire harness is routed or a path of the wire harness within the vehicle is changed, and the long member held by the long member fixation portion interferes with surrounding objects, the path of the long member cannot be defined to a path where the long member will not interfere with surrounding objects.

The present invention has been conceived in view of the above points, and seeks to provide a technology capable of improving a degree of freedom for a path of a long member arranged along a surface of a sheathing member covering a wire bundle.

Means for Solving the Problems

A wire harness according to a first aspect includes a wire bundle; a sheathing member covering the wire bundle and configured from a nonwoven member that has been hot-pressed, and a long member to be arranged along a surface of the sheathing member. The sheathing member includes a plurality of path regulators along each of an extension direction and a circumference direction of the wire bundle, the path regulators being capable of regulating a path of the long member to be arranged along the surface of the sheathing member. The sheathing member includes a line formed by the plurality of path regulators provided along the extension direction of the wire bundle, a plurality of which lines are provided along the circumference direction of the wire bundle. The path of the long member is regulated by a portion of the plurality of path regulators configuring a first line included in the plurality of lines, and by a portion of the plurality of path regulators configuring a second line included in the plurality of lines and different from the first line, such that the long member does not interfere with surrounding objects.

A wire harness according to a second aspect is the wire harness according to the first aspect, in which the path regulator is a portion of the sheathing member which rises away from the surface of the sheathing member.

A wire harness according to a third aspect is the wire harness according to the first aspect, in which the path regulator is formed by punching out a portion of the sheathing member.

Effect of the Invention

According to the first through third aspects, the plurality of path regulators are provided along each of the extension direction and the circumference direction of the wire bundle, the path regulators being capable of regulating the path of the long member to be arranged along the surface of the sheathing member. Therefore, a degree of freedom for the path of the long member can be improved.

According to the second aspect in particular, the path regulator is a portion of the sheathing member which rises away from the surface of the sheathing member. Therefore, the path regulator can easily be formed on the sheathing member.

According to the third aspect in particular, the path regulator is a portion which has been punched out of the sheathing member. Therefore, the path regulator can easily be formed on the sheathing member and, in addition, can be inhibited from interfering with surrounding objects.

Also, according to the first through third aspects, the sheathing member includes the line formed by the plurality of path regulators provided along the extension direction of the wire bundle, a plurality of which lines are provided along the circumference direction of the wire bundle. Therefore, the degree of freedom for the path of the long member can be further improved.

The purpose(s), characteristic feature(s), aspect(s), and advantage(s) of the present invention are further explicated by the following detailed description and attached drawings.

MODE FOR CARRYING OUT THE INVENTION

Figure 1:
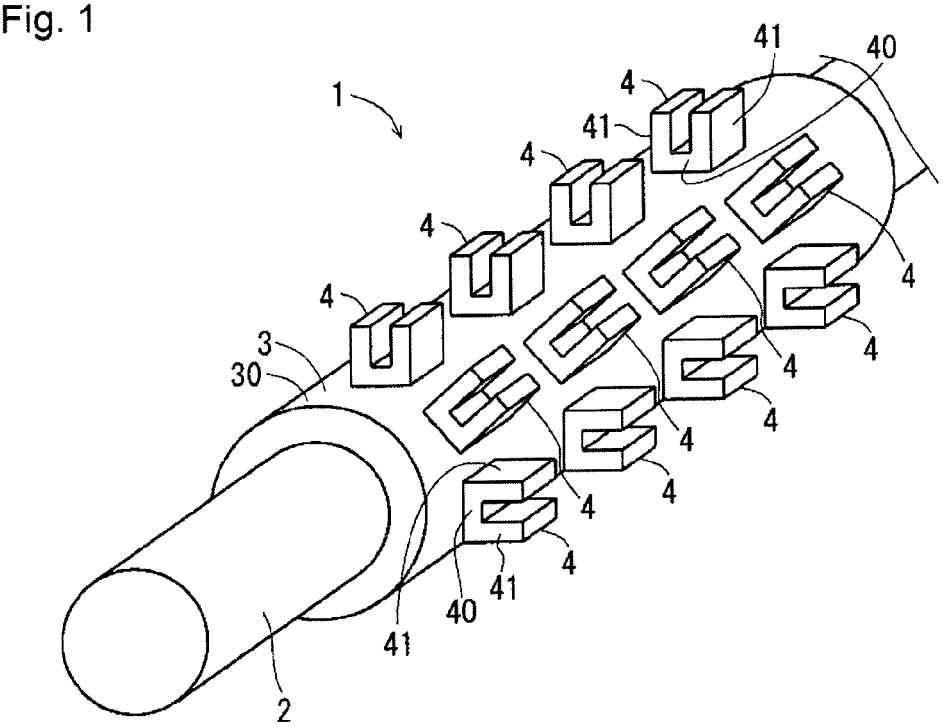
FIG. 1 is a perspective view of a wire harness.
Figure 2:
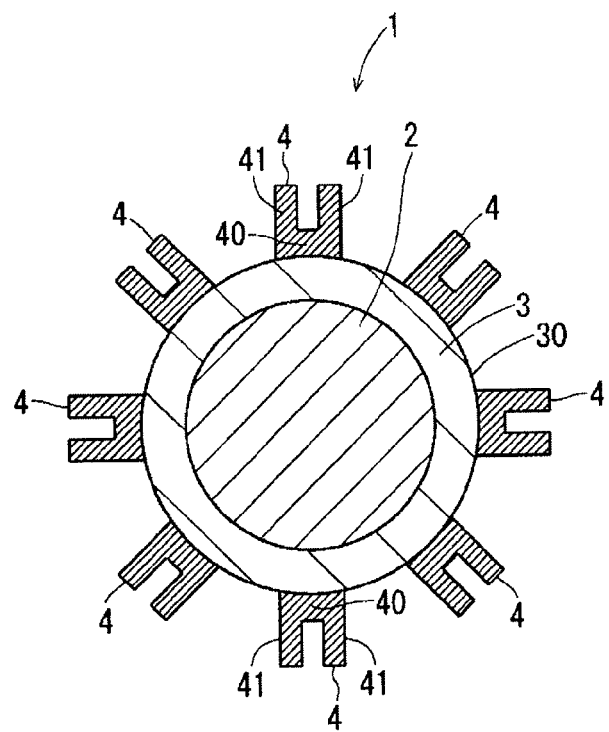
FIG. 2 is a cross-sectional view of the wire harness.

FIG. 1 is a perspective view illustrating a wire harness 1 according to an embodiment. FIG. 2 illustrates a cross-sectional structure of the wire harness 1 in a direction perpendicular to an extension direction of the wire harness 1. The wire harness 1 according to the present embodiment is routed, for example, in an interior of a vehicle such as an automobile.

As shown in FIGS. 1 and 2, the wire harness 1 includes a wire bundle 2 in which a plurality of electric wires are bundled together, and a sheathing member 3 covering the wire bundle 2. A plurality of path regulators 4 are provided on a surface 30 (exterior surface) of the sheathing member 3, the path regulators 4 being capable of regulating a path of a long member to be arranged along the surface 30.

The sheathing member 3 has a function of regulating the path of the wire bundle 2 when the wire harness 1 is routed in the vehicle, as well as a function of protecting the wire bundle 2 from interference by objects in a vicinity of the wire harness 1. The sheathing member 3 is formed with a nonwoven member (e.g., a nonwoven fabric) which has been hot-pressed. Herein, hot-pressing refers to a process of inserting a nonwoven member between dies and applying pressure to the dies in a heated state to mold the nonwoven member. A nonwoven member capable of hardening when subjected to a heating process can be used as the nonwoven member. A nonwoven member that includes elementary fibers and an adhesive resin (also referred to as a binder) interlaced with the elementary fibers can be used as such a nonwoven member. The adhesive resin is a resin having a melting point (for example, 110° C.-115° C.) lower than that of the elementary fibers. When the nonwoven member is heated to a processing temperature lower than the melting point of the elementary fibers and higher than the melting point of the adhesive resin, the adhesive resin melts and soaks in between the elementary fibers. Thereafter, when the nonwoven member cools to a temperature below the melting point of the adhesive resin, the adhesive resin solidifies in a state bonding the elementary fibers with one another. As a result, the nonwoven member becomes harder than in the state prior to heating and is maintained in a shape molded during heating.

The elementary fibers may be any fiber capable of maintaining a fiber state at the melting point of the adhesive resin. Thus, in addition to resin fiber, various fibers can be used as the elementary fibers. Further, a thermoplastic resin fiber having a melting point lower than the melting point of the elementary fibers can be used as the adhesive resin. The adhesive resin may be granular or fibrous. Further, it is also possible to configure a binder fiber by forming an adhesive resin layer on an outer circumference of a core fiber and to interweave the binder fiber with the elementary fibers. A fiber of the same material as the above elementary fiber can be used as the core fiber in such a case.

An example of the combination of the elementary fiber and the adhesive resin is using a resin fiber of PET (polyethylene terephthalate) as the elementary fiber and a copolymer resin of PET and PEI (polyethylene isophthalate) as the adhesive resin. In this case, the melting point of the elementary fiber is about 250° C. and the melting point of the adhesive resin is 110° C.-150° C. Therefore, when the nonwoven member is heated to a temperature of 110° C.-250° C., the adhesive resin melts and soaks in between the elementary fibers, which maintain a fibrous shape and do not melt. Then, when the nonwoven member cools to a temperature below the melting point of the adhesive resin, the adhesive resin solidifies in a state bonding the elementary fibers with one another and the nonwoven member stiffens, maintaining the shape molded during the heating.

An exemplary method of covering the circumference of the wire bundle 2 with the nonwoven member which may be employed is a method in which a strip-like, sheet-like nonwoven member having a narrow width is wrapped around the wire bundle 2 in a partially overlapping spiral. Alternatively, a method may be employed in which a strip-like, sheet-like nonwoven member has a width equal to a length of a portion of the wire bundle 2 covered by the sheathing member 3, and is wrapped once or a plurality of times around the wire bundle 2 such that both width-direction ends are gathered.

The shape of the die used in the hot-pressing may match, or may not match, the shape of the wire bundle 2 after the wire harness 1 has been routed within the vehicle and the like. In the former case, simultaneous with the conclusion of hot-pressing, the shape of the sheathing member 3 is molded so as to match the shape of the wire bundle 2 after routing of the wire harness 1. Meanwhile, in the latter case, hot-pressing concludes and, before the nonwoven member hardens, the shape of the sheathing member 3 is molded so as to match the shape of the wire bundle 2 after routing of the wire harness 1.

Each path regulator 4 is formed with resin, for example, and is provided as a component distinct from the sheathing member 3. A plurality of the path regulators 4 are provided away from one another across the entire surface 30 of the sheathing member 3. The plurality of path regulators 4 (four path regulators 4 in the example of FIG. 1) positioned away from one another along the extension direction of the wire bundle 2 form a line on the surface 30 of the sheathing member 3, and a plurality of these lines are provided along a circumference direction of the wire bundle 2. Put another way, the plurality of path regulators 4 positioned away from one another along the circumference direction of the wire bundle 2 form a line on the surface 30 of the sheathing member 3, and a plurality of these lines are provided along the extension direction of the wire bundle 2. When viewing the extension direction of the wire bundle 2 as, for example, a row direction and the circumference direction of the wire bundle 2 as, for example, a column direction, the plurality of path regulators 4 are arranged in a matrix on the surface 30 of the sheathing member 3. Thereby, the plurality of path regulators 4 are arranged along the extension direction of the wire bundle 2 and are also arranged along the circumference direction of the wire bundle 2.

Hereafter, the line formed by the plurality of path regulators 4 (four path regulators 4 in the present example) aligned in the extension direction of the wire bundle 2 is referred to as an "extension direction path regulator group." A plurality of the extension direction path regulator groups are provided to the sheathing member 3 along the circumference direction of the wire bundle 2.

Each of the path regulators 4 has a shape capable of holding a long member to be arranged along the surface 30 of the sheathing member 3. Each of the path regulators 4 has a shape in which a plate-like member is bent into a squared "U" shape, and each is configured by a bottom plate 40 to be attached to the sheathing member 3 and a pair of side plates 41 standing upright at two end portions of the bottom plate 40 so as to face each other. A screw is attached to a reverse surface of the bottom plate 40 and, by tightening the screw to the sheathing member 3, the bottom plate 40 is attached to the sheathing member 3. The long member arranged along the surface 30 of the sheathing member 3 is held by the path regulator 4 by being sandwiched between the pair of side plates 41 of the path regulator 4.

In each of the extension direction path regulator groups, the plurality of path regulators 4 aligned in the extension direction of the wire bundle 2 which configure the extension direction path regulator group are arranged such that the pair of side plates 41 on each of the plurality of path regulators 4 face each other in the circumference direction of the wire bundle 2. Thereby, the plurality of path regulators 4 aligned in the extension direction of the wire bundle 2 can hold the long member such that the long member is arranged along the extension direction of the wire bundle 2.

Figure 3:
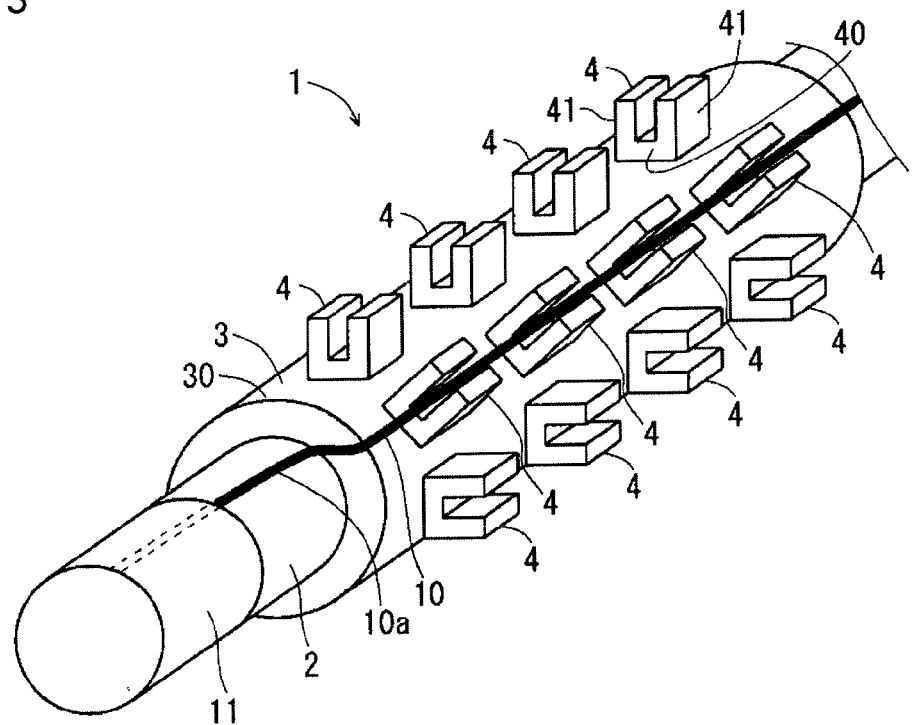
FIG. 3 is a perspective view of the wire harness with a long member attached.
Figure 4:
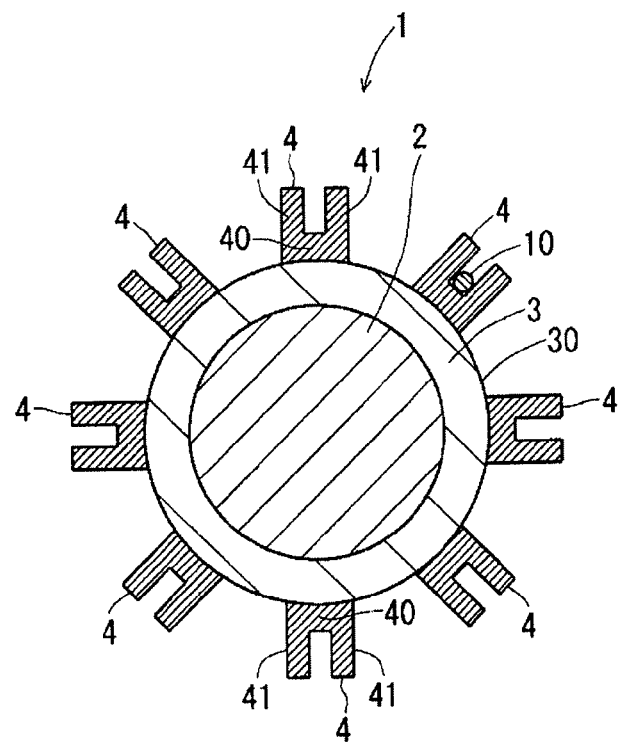
FIG. 4 is a cross-sectional view of the wire harness with the long member attached.

FIG. 3 illustrates a path of a long member 10, which is arranged along the surface 30 of the sheathing member 3, being regulated by the path regulators 4. FIG. 4 illustrates a cross-sectional structure of the wire harness 1 in a direction perpendicular to the extension direction of the wire harness 1 shown in FIG. 3.

The long member 10 may be, for example, an antenna feeder wire, a trunk opener cable, or a washer fluid tube. When the wire harness 1 is routed in the vehicle, the path of the long member 10 arranged along the surface 30 of the sheathing member 3 of the wire harness 1 is regulated by the path regulators 4 provided to the sheathing member 3 such that the long member 10 does not interfere with surrounding objects.

In the example of FIGS. 3 and 4, the long member 10 is held by a single extension direction path regulator group. Accordingly, the path of the long member 10 is regulated by the four path regulators 4 configuring the extension direction path regulator group so as to follow the extension direction of the wire bundle 2. The long member 10 includes a portion 10a arranged along a surface of a portion of the wire bundle 2 not covered by the sheathing member 3, and the portion 10a is fixated to the wire bundle 2 by an adhesive tape 11, for example.

When a layout of components within the vehicle (vehicle layout) on which the wire harness 1 is routed is changed, or a routing path of the wire harness 1 is changed, the long member 10 arranged along the surface 30 of the sheathing member 3 of the wire harness 1 may come to interfere with surrounding objects. The wire harness 1 according to the present embodiment is configured to be capable of readily defining the path of the long member 10, in such a case, to a path in which the long member 10 does not interfere with surrounding objects.

Figure 5:
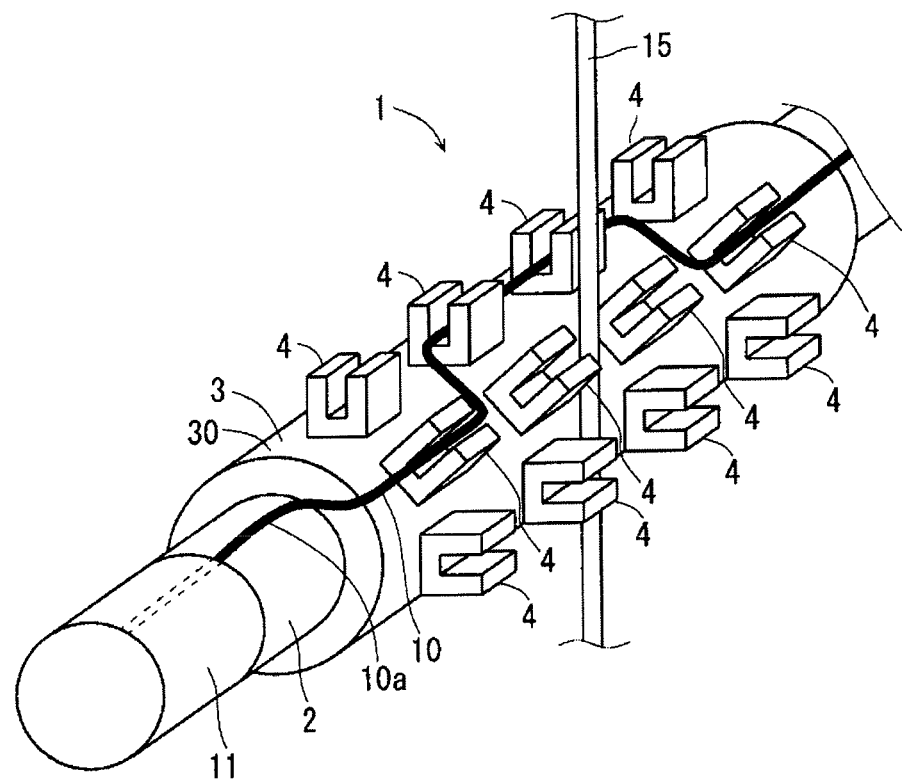
FIG. 5 is a perspective view of the wire harness with the long member attached.

FIG. 5 illustrates a situation where the path of the long member 10 has been changed for the wire harness 1 shown in FIG. 3 to which the long member 10 was attached. An interfering pipe 15 is shown in FIG. 5 located in the vicinity of the wire harness 1.

When the pipe 15 comes to be positioned proximate to the wire harness 1, as shown in FIG. 5, due to changing the vehicle layout or changing the routed path of the wire harness 1, the pipe 15 and the long member 10 will interfere with each other on the path of the long member 10 shown in FIG. 3. Accordingly, the path of the long member 10 shown in FIG. 5 is defined to a path in which the long member 10 does not interfere with the pipe 15. In the example shown in FIG. 5, the long member 10 is held by the two end path regulators 4 of the four path regulators 4 configuring one extension direction path regulator group, and by the two middle path regulators 4 of the four path regulators 4 configuring a different extension direction path regulator group adjacent, in the circumference direction of the wire bundle 2, to the first extension direction path regulator group. Thereby, the path of the long member 10 is changed from the straight-line path of FIG. 3 to a path diverted in the circumference direction of the wire bundle 2 so as to avoid the pipe 15.

In this way, in the wire harness 1 according to the present embodiment, the plurality of path regulators 4 are provided to the sheathing member 3 along each of the extension direction and the circumference direction of the wire bundle 2, the path regulators 4 being capable of regulating the path of the long member 10 to be arranged along the surface 30 of the sheathing member 3. Therefore, the long member 10 can be arranged along each of the extension direction and the circumference direction of the wire bundle 2. Accordingly, a degree of freedom in the path of the long member 10 is improved. Thus, the path of the long member 10 can be determined according to circumstances in the vicinity of the wire harness 1. As a result, the long member 10 can be reliably prevented from interfering with surrounding objects.

Further, in the present embodiment, the plurality of path regulators 4 arranged along the extension direction of the wire bundle 2 form a line, and a plurality of these lines are provided along the circumference direction of the wire bundle 2, or, put another way, the plurality of path regulators 4 arranged along the circumference direction of the wire bundle 2 form a line, and a plurality of these lines are provided along the extension direction of the wire bundle 2. Thereby, the degree of freedom of the path of the long member 10 can be further improved. Thus, the long member 10 can be more reliably prevented from interfering with surrounding objects.

Moreover, the path regulator 4 may be configured such that a distance between the pair of side plates 41 is made larger than a diameter of the long member 10 and the long member 10 is not sandwiched between the pair of side plates 41. Even in such a case, by passing the long member 10 through a space between the pair of side plates 41 of the path regulator 4, the path of the long member 10 can be regulated by the path regulator 4.

In addition, the long member 10 may be attached to the wire harness 1 after the wire harness 1 has been routed within the vehicle, or may be attached to the wire harness 1 before the wire harness 1 is routed within the vehicle.

VARIOUS MODIFICATIONS

First Modification

Figure 6:
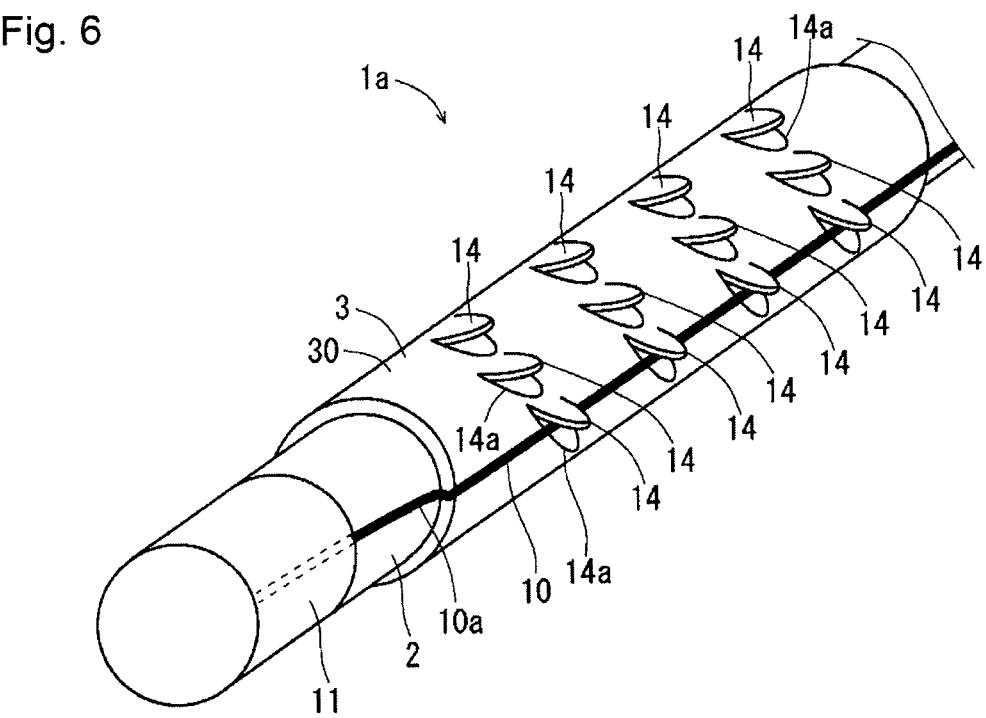
FIG. 6 is a perspective view of a first modified example of a wire harness.

FIG. 6 is a perspective view illustrating a wire harness 1a according to a first modification. In FIG. 6, the wire harness 1a is shown with the long member 10 attached. The wire harness 1a according to the present modification provides a path regulator 14 instead of the path regulator 4 of the wire harness 1 according to the above-described embodiment. Hereafter, the description will focus on differences between the wire harness 1a according to the present modification and the wire harness 1.

Each of the path regulators 14 is integrally formed with the sheathing member 3 and a surface shape thereof forms a bow-shaped (a portion of a circle bounded by an arc and a bowstring linking two ends thereof) plate-like portion. Each of the path regulators 14 is configured to be capable of pinching and holding the long member 10 between the path regulator 14 and the sheathing member 3.

Each of the path regulators 14 is configured by a portion of the sheathing member 3 which rises away from the surface 30 of the sheathing member 3. An angle of rise for each of the path regulators 14 is an acute angle. An arced incision 14a is formed in the surface 30 of the sheathing member 3, the arced incision 14a penetrating the sheathing member 3 in a thickness direction thereof, and a portion of the sheathing member 3 on an interior side of the incision 14a is raised. The raised portion forms the path regulator 14. Accordingly, a bowstring portion of the bow shape formed by each of the path regulators 14 is connected to the sheathing member 3.

In each of the path regulators 14, a portion of the sheathing member 3 configuring that path regulator 14 is raised along the circumference direction of the wire bundle 2. Thereby, the plurality of path regulators 14 aligned in the extension direction of the wire bundle 2 are configured to be capable of pinching and holding the long member 10 between the path regulators 14 and the sheathing member 3 such that the long member 10 follows the extension direction of the wire bundle 2.

In the example of FIG. 6, the long member 10 is held by four path regulators 14 arranged along the extension direction of the wire bundle 2. Accordingly, the path of the long member 10 is regulated by the four path regulators 14 so as to follow the extension direction of the wire bundle 2.

Figure 7:
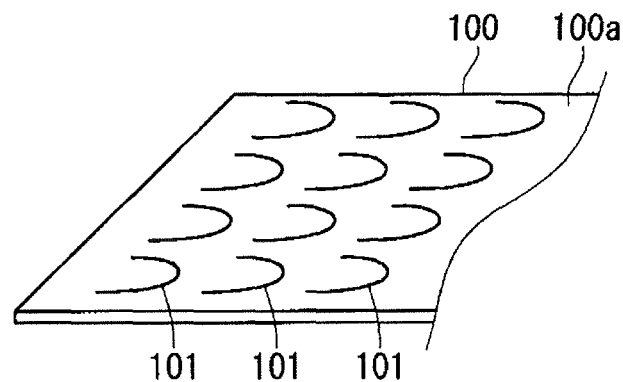
FIG. 7 illustrates incisions cut into a nonwoven member.

Next, a method of manufacturing the wire harness 1a according to the present modification is described. First, as shown in FIG. 7, a plurality of arced incisions 101 are provided in a matrix pattern to a surface 100a of a sheet-like nonwoven member 100, which will become the sheathing member 3. Each of the incisions 101 passes through the nonwoven member 100 in a thickness direction. The incision 101 will become the incision 14a in the surface 30 of the sheathing member 3.

Figure 8:
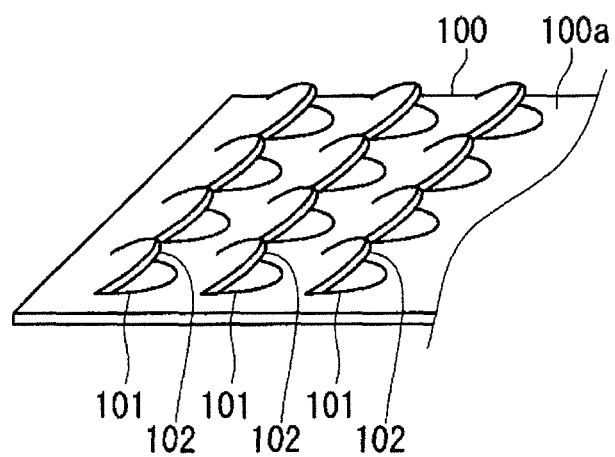
FIG. 8 illustrates raised portions of the nonwoven member.

Next, as shown in FIG. 8, bow-shaped plate-like portions 102 of the nonwoven member 100, which are bounded by each of the incisions 101, are raised away from the surface 100a. The bow-shaped plate-like portions 102 will become the path regulators 14.

Next, the nonwoven member 100 is wrapped around the wire bundle 2 such that the plurality of raised bow-shaped plate-like portions 102 are positioned on the exterior. Then, the nonwoven member 100 is hot pressed. Thereby, the wire harness 1a is completed, the wire harness 1a including the wire bundle 2 and the sheathing member 3 covering the wire bundle 2.

Moreover, the nonwoven member 100 may be wrapped around the wire bundle 2 immediately after the plurality of incisions 101 are provided in the nonwoven member 100. When the nonwoven member 100 provided with the incisions 101 is wrapped around the wire bundle 2, the bow-shaped plate-like portions 102 on the nonwoven member 100, which are bounded by the incisions 101, are configured to rise away naturally, and therefore there is no strict necessity of raising the bow-shaped plate-like portions 102 prior to wrapping the nonwoven member 100 around the wire bundle 2.

Figure 9:
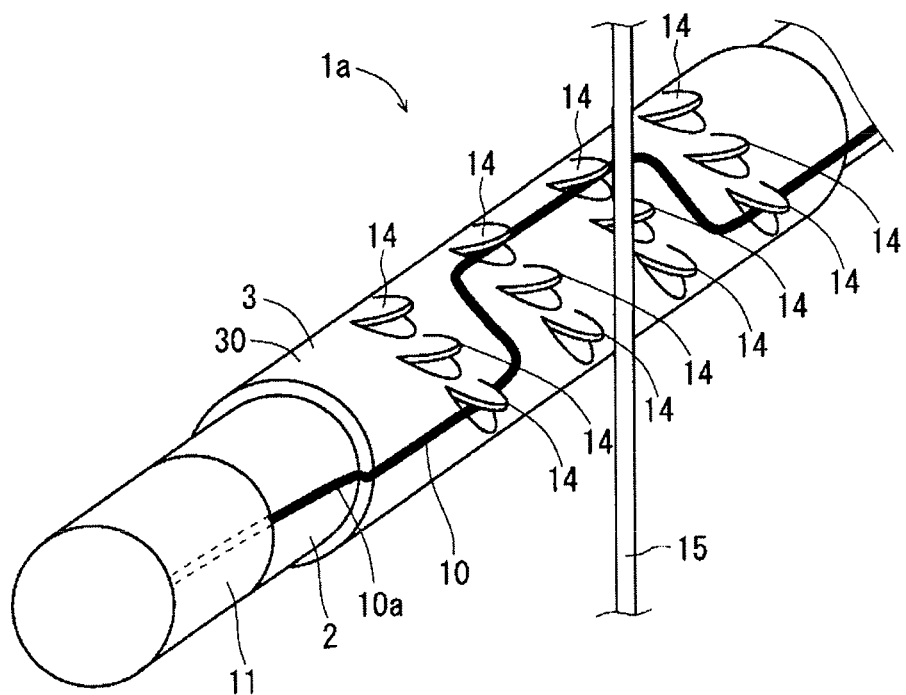
FIG. 9 is a perspective view of the first modified example of the wire harness.

When the pipe 15 comes to be positioned proximate to the wire harness 1a and the pipe 15 and the long member 10, which is attached to the wire harness 1a, interfere with each other due to changing the vehicle layout or changing the routed path of the wire harness 1a, the path of the long member 10 can be changed from that shown in FIG. 6 to that shown in FIG. 9. In the example of FIG. 9, the path of the long member 10 is changed from the straight-line path of FIG. 6 to a path diverted in the circumference direction of the wire bundle 2 so as to avoid the pipe 15.

In this way, in the wire harness 1a according to the present modification, similar to the wire harness 1 described above, the plurality of path regulators 14 are provided to the sheathing member 3 along each of the extension direction and the circumference direction of the wire bundle 2, the path regulators 14 being capable of regulating the path of the long member 10 to be arranged along the surface 30 of the sheathing member 3. Therefore, the degree of freedom for the path of the long member 10 can be improved. Thus, the long member 10 can be reliably prevented from interfering with surrounding objects.

Moreover, in the present modification, the path regulators 14 are portions of the sheathing member 3 which rise away from the surface 30 of the sheathing member 3. Therefore, as noted above, the path regulators 14 can be easily formed on the sheathing member 3.

Second Modification

Figure 10:
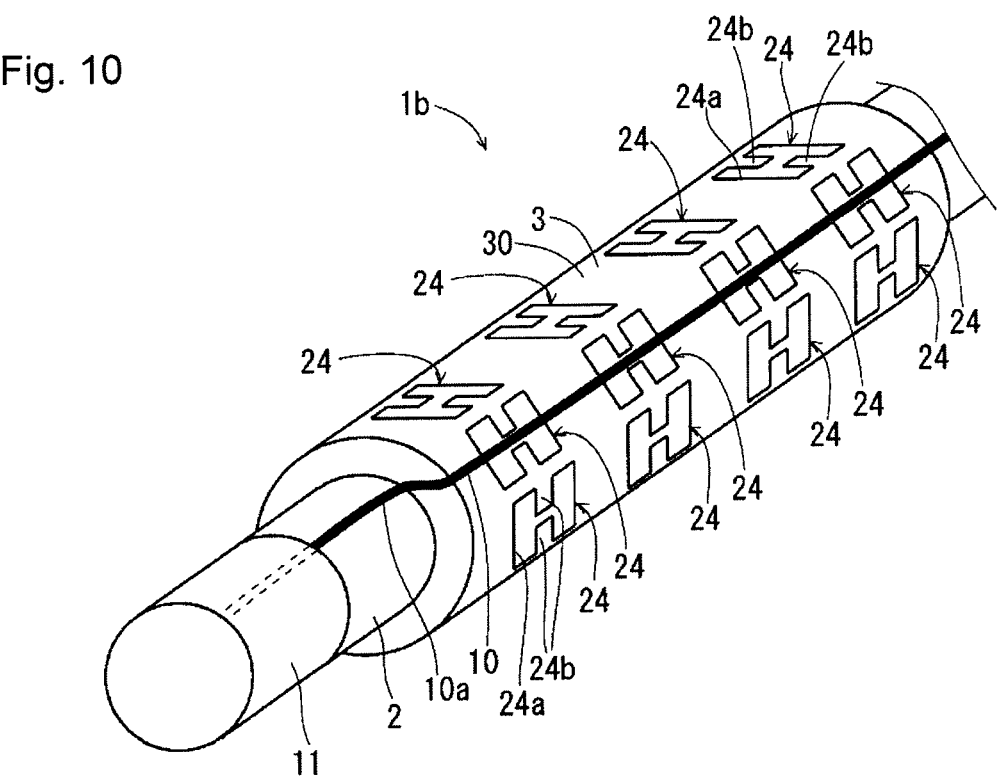
FIG. 10 is a perspective view of a second modified example of a wire harness.

FIG. 10 is a perspective view illustrating a wire harness 1b according to a second modification. In FIG. 10, the wire harness 1b is shown with the long member 10 attached. The wire harness 1b according to the present modification provides a path regulator 24 instead of the path regulator 4 of the wire harness 1 according to the above-described embodiment. Hereafter, the description will focus on differences between the wire harness 1b according to the present modification and the wire harness 1.

Figure 11:
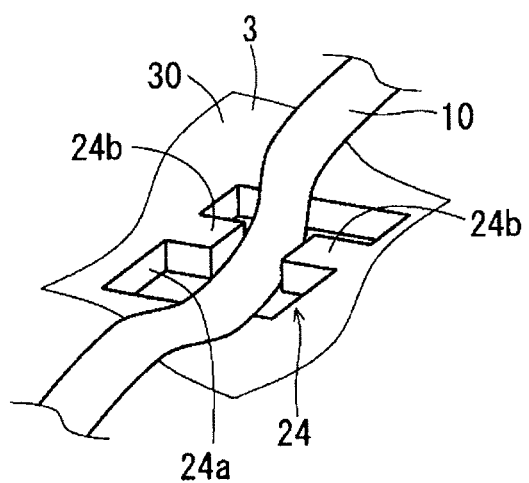
FIG. 11 is an expanded view of a path regulator of the second modified example of the wire harness.

FIG. 11 is an expanded view of the path regulator 24. Each of the path regulators 24 is formed by punching out a portion of the sheathing member 3, for example in an "H" shape. Each of the path regulators 24 is configured by a through-hole 24a having a square shape in a plan view and provided to the surface 30 of the sheathing member 3, and a pair of projections 24b projecting from side walls of the through-hole 24a so as to face each other with a gap therebetween. The pair of projections 24b in each of the path regulators 24 are integrally formed with the sheathing member 3. In each of the path regulators 24, the distance between the pair of projections 24b is slightly smaller than a diameter of the long member 10, and the pair of projections 24b are configured to be capable of pinching and holding the long member 10.

Each of the path regulators 24 is provided to the sheathing member 3 such that the pair of projections 24b oppose each other in the circumference direction of the wire bundle 2. Thereby, the plurality of path regulators 24 aligned in the extension direction of the wire bundle 2 can hold the long member 10 such that the long member 10 follows the extension direction of the wire bundle 2.

In the example of FIG. 10, the long member 10 is held by four path regulators 24 arranged along the extension direction of the wire bundle 2. Accordingly, the path of the long member 10 is regulated by the four path regulators 24 so as to follow the extension direction of the wire bundle 2.

Figure 12:
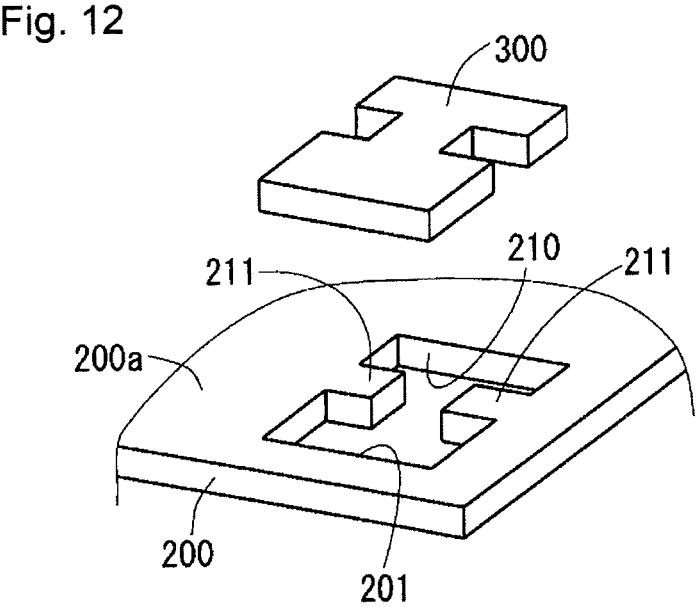
FIG. 12 illustrates a nonwoven member having a portion punched out by a die.

Next, a method of manufacturing the wire harness 1b according to the present modification is described. First, as shown in FIG. 12, portions of a sheet-like nonwoven member 200, which will become the sheathing member 3, are punched out in the thickness direction of the nonwoven member 200 using an H-shaped die 300, and a through-hole 201 having an "H" shape in a plan view (hereafter referred to as an H-shaped through-hole 201) is formed in a surface 200a of the nonwoven member 200. Thereby, a through-hole 210 and a pair of projections 211 are formed in the nonwoven member 200, the through-hole 210 having a square shape in a plan view and passing through the nonwoven member 200 in the thickness direction, and the pair of projections 211 projecting from side walls of the through-hole 210 so as to face each other with a gap therebetween. The through-hole 210 and the pair of projections 211 will become, respectively, the through-hole 24a and the pair of projections 24b of the path regulator 24. A plurality of the H-shaped through-holes 201 are formed on the nonwoven member 200 in a matrix shape.

Next, the nonwoven member 200 having the plurality of H-shaped through-holes 201 formed thereon is wrapped around the wire bundle 2. Then, the nonwoven member 200 is hot pressed. The wire harness 1b is then completed, the wire harness 1b including the wire bundle 2 and the sheathing member 3 covering the wire bundle 2.

Figure 13:
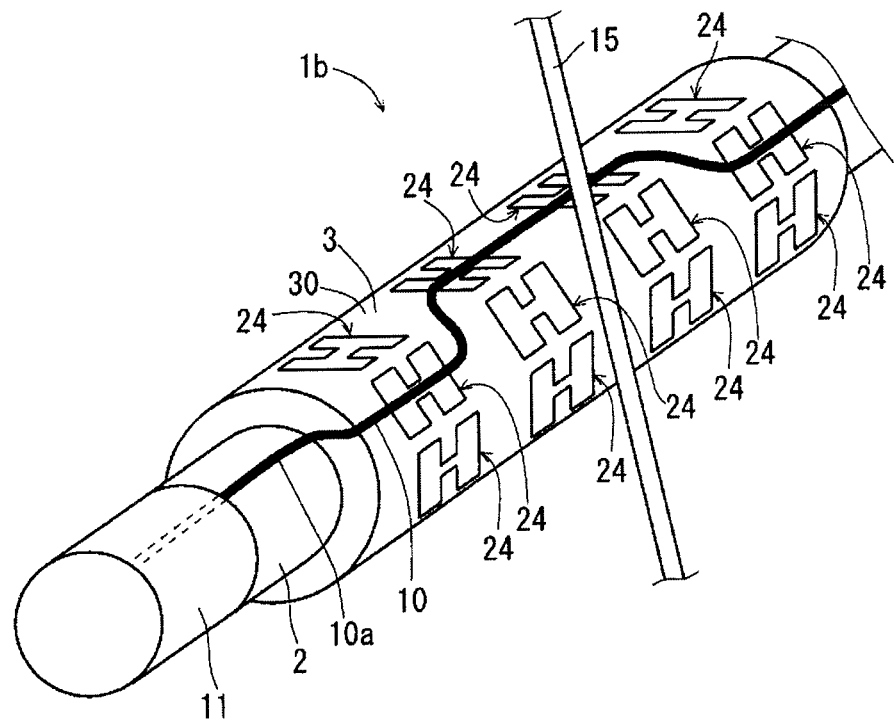
FIG. 13 is a perspective view of the second modified example of the wire harness.

When the pipe 15 comes to be positioned proximate to the wire harness 1b and the pipe 15 and the long member 10, which is attached to the wire harness 1b, interfere with each other due to changing the vehicle layout or changing the routed path of the wire harness 1b, the path of the long member 10 can be changed from that shown in FIG. 10 to that shown in FIG. 13. In the example of FIG. 13, the path of the long member 10 is changed from the straight-line path of FIG. 10 to a path diverted in the circumference direction of the wire bundle 2 so as to avoid the pipe 15.

In this way, in the wire harness 1b according to the present modification, the plurality of path regulators 24 are provided to the sheathing member 3 along each of the extension direction and the circumference direction of the wire bundle 2, the path regulators 24 being capable of regulating the path of the long member 10 to be arranged along the surface 30 of the sheathing member 3. Therefore, the degree of freedom for the path of the long member 10 can be improved. Thus, the long member 10 can be reliably prevented from interfering with surrounding objects.

Moreover, in the present modification, the path regulators 24 are portions of the sheathing member 3 which have been punched out. Therefore, as noted above, the path regulators 24 can be easily formed on the sheathing member 3 and, in addition, the path regulators 24 can be inhibited from interfering with surrounding objects.

Third Modification

Figure 14:
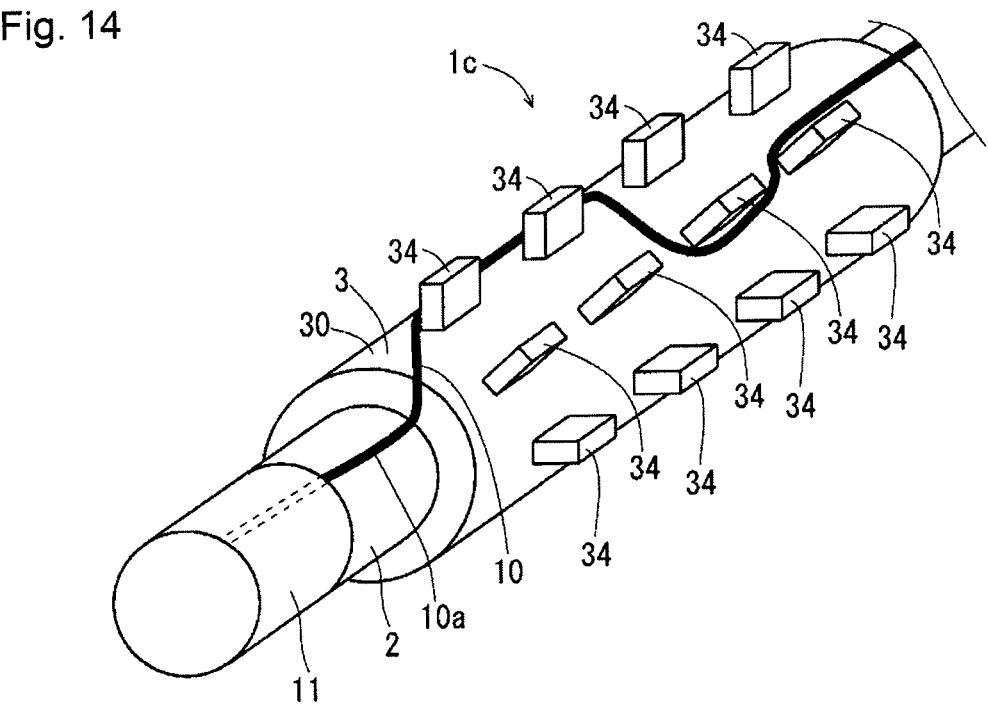
FIG. 14 is a perspective view of a third modified example of a wire harness.

FIG. 14 is a perspective view illustrating a wire harness 1c according to a third modification. In FIG. 14, the wire harness 1c is shown with the long member 10 attached. The wire harness 1c, according to the present modification provides a path regulator 34 instead of the path regulator 4 of the wire harness 1 according to the above-described embodiment.

Each of the path regulators 34 is configured by a projection provided upright on the surface 30 of the sheathing member 3. Each of the path regulators 34 is, for example, a rectangular plate-shaped projection and is provided such that a longitudinal direction thereof is parallel in the extension direction of the wire bundle 2. The path regulators 34 may be integrally formed with the sheathing member 3, or may be formed separately from the sheathing member 3.

As shown in FIG. 14, in the wire harness 1c having a plurality of the path regulators 34 of this kind, by catching the long member 10 on the path regulators 34 (projections) while dragging the long member 10 along the surface 30 of the sheathing member 3, the long member 10 can be arranged along the surface 30 of the sheathing member 3 while regulating the path of the long member 10.

In this way, unlike in the above-described embodiment and in the first and second modifications, even when the path regulators 34 cannot themselves hold the long member 10, the long member 10 can be regulated by the path regulators 34.

In the above, the present invention is described in detail. However, the above description is in all aspects exemplary and the present invention is not limited by the description. Numerous modifications not given as examples are understood to be conceivable without departing from the scope of the present invention.

DESCRIPTION OF REFERENCE NUMERALS 1, 1a, 1b, 1c Wire harness
2 Wire bundle
3 Sheathing member
4, 14, 24, 34 Path regulator

The invention claimed is:
1. A wire harness comprising:
a wire bundle;
a sheathing member covering the wire bundle and configured from a nonwoven member that has been hot-pressed; and
a long member arranged along a surface of the sheathing member,
wherein the sheathing member includes a plurality of path regulators positioned away from each other along each of an extension direction and a circumference direction of the wire bundle, the path regulators configured for regulating a path of the long member,
the sheathing member including a line formed by the plurality of path regulators provided along the extension direction of the wire bundle, a plurality of the lines being provided along the circumference direction of the wire bundle, and
the path of the long member being regulated by a portion of the plurality of path regulators in a first of the plurality of lines, and by a portion of the plurality of path regulators in a second of the plurality of lines, such that the long member does not interfere with surrounding objects.

2. The wire harness according to claim 1, wherein the path regulator is a portion of the sheathing member which rises away from the surface of the sheathing member.

3. The wire harness according to claim 1, wherein the path regulator is formed by punching out a portion of the sheathing member.

4. A wire harness comprising:
a wire bundle;
a sheathing member covering the wire bundle and configured from a nonwoven member that has been hot-pressed; and
a long member arranged along a surface of the sheathing member,
wherein the sheathing member includes a plurality of path regulators along each of an extension direction and a circumference direction of the wire bundle, the path regulators configured for regulating a path of the long member,
the sheathing member including a line formed by the plurality of path regulators provided along the extension direction of the wire bundle, a plurality of the lines being provided along the circumference direction of the wire bundle,
the path of the long member being regulated by a portion of the plurality of path regulators in a first of the plurality of lines, and by a portion of the plurality of path regulators in a second of the plurality of lines, such that the long member does not interfere with surrounding objects, and
wherein the path regulator is formed by punching out a portion of the sheathing member.

* * * * *